United States Patent [19]

Korpela et al.

[11] Patent Number: 4,852,028
[45] Date of Patent: Jul. 25, 1989

[54] METHOD AND APPARATUS FOR MEASURING AND CONTROLLING THE VOLUMETRIC WEIGHT OF AN EXPANDED PARTICULATE MATERIAL

[76] Inventors: Heikki Korpela, Hövitsmansgatan 8, Helsingborg, Sweden, S-252 37; Leif Ampler, Kaprifolgatan 65, Västra Frölunda, Sweden, S-421 69

[21] Appl. No.: 29,918

[22] Filed: Mar. 25, 1987

Related U.S. Application Data

[63] Continuation of Ser. No. 892,723, Jul. 29, 1986, abandoned, which is a continuation of Ser. No. 611,001, filed as PCT SE83/00306 on Aug. 30, 1983, published as WO84/01123 on Mar. 29, 1984, abandoned.

[30] Foreign Application Priority Data

Sep. 14, 1982 [SE] Sweden .............................. 8205227-5

[51] Int. Cl.⁴ ..................... G01N 5/02; G01F 17/00; G01G 13/00
[52] U.S. Cl. .................. 364/567; 264/40.4; 264/40.1; 222/77; 73/73; 73/149
[58] Field of Search ................ 364/567, 550; 264/40, 264/40.4, 40.6, 40.7, 50, 51, 53; 73/73, 76, 149; 222/77; 131/291, 296, 303, 305, 902; 177/25, 25.11, 25.12, 25.18; 324/61 R; 241/34

[56] References Cited

U.S. PATENT DOCUMENTS

| | | | |
|---|---|---|---|
| 3,378,245 | 4/1968 | Frank | 264/40.6 |
| 3,880,705 | 4/1975 | Tilburg | 131/902 X |
| 4,023,021 | 5/1977 | Kuschel | 364/567 |
| 4,193,116 | 3/1980 | Funk | 364/567 |
| 4,195,647 | 4/1980 | Wochnowski | 131/902 |
| 4,403,191 | 9/1983 | Satake | 324/191 |
| 4,567,752 | 2/1986 | Labbeé | 73/73 X |
| 4,721,448 | 1/1988 | Irish et al. | 264/40.6 X |
| 4,721,588 | 1/1988 | Burchard et al. | 264/53 X |

Primary Examiner—Gary Chin
Assistant Examiner—Joseph L. Dixon
Attorney, Agent, or Firm—Merchant, Gould, Smith, Edell, Welter & Schmidt

[57] ABSTRACT

Raw material to be expanded is supplied to an expansion chamber (12). The volumetric weight (M) and the moisture content (F) of the expanded material is measured, and signals representing the measured values obtained, are supplied to a microcomputer (27). This is programmed for comparing the volumetric weight as measured with a nominal value of the volumetric weight at the prevailing moisture content of the expanded material and is adapted to supply in dependence of the comparison made a signal for controlling the screw conveyor and drive unit (11, 13) for the supply of raw material to the expansion chamber to control the expansion of the material in dependence of the comparison by increasing or decreasing the amount of raw material supplied per unit of time.

3 Claims, 3 Drawing Sheets

4,852,028

METHOD AND APPARATUS FOR MEASURING AND CONTROLLING THE VOLUMETRIC WEIGHT OF AN EXPANDED PARTICULATE MATERIAL

This is a continuation of application Ser. No. 892,723, filed July 29, 1986, which is a continuation of application Ser. No. 611,001 filed as PCT SE83/00306 on Aug. 30, 1983, published as WO84/01123 on Mar. 29, 1984, both now abandoned.

TECHNICAL FIELD

The present invention relates to method and apparatus for measuring and controlling the volumetric weight of an expanded particulate material.

BACKGROUND OF THE INVENTION

When products including expanded plastic material are being manufactured it is essential, considering economy as well as quality, that the plastic material has a correct volumetric weight. That is, that the material has been allowed to expand to a predetermined degree because a volumetric weight which is too high means higher production costs, and a volumetric weight which is too low, results in a bad product. Therefore, it is necessary to follow up carefully the volumetric weight of expanded plastic material which is used in product manufacture.

The manufacture of insulating slabs of expanded polystyrene is one example of a product for which it is very important to follow carefully the volumetric weight of the plastic material included therein. Said product is standardized and it is required, for example, for an insulating slab which should have nominally a volumetric weight of 15 kg/m$^3$ that the volumetric weight is within the range from 14.5 to 15.5 kg/m$^3$. The basic material is granulated polystyrene having a volumetric weight of 600 to 700 kg/m$^3$, and this material is pre-expanded in one or more stages by a continuous or discontinuous process to a volumetric weight of 15 to 20 kg/m$^3$ before it is introduced into the machine for manufacturing the slabs of expanded polystyrene. Further expansion of the pre-expanded material takes place in order to sinter together the material so as to form homogeneous blocks or slabs. When no accurate control of the volumetric weight is applied one is inclined to maintain said weight in the center of the volumetric weight range established by the prescribed standard so as to be on the safe side. However, when an accurate control is applied the volumetric weight can be maintained closer to the lower limit. This implies a reduced consumption of the basic material and thus a reduction of costs, which is not unimportant if the manufacture of large quantities is concerned. At the same time there will be obtained, without doubt, an acceptable product, thus less scrapping and fewer complaints.

By the method according to the invention it is well suited to be integrated with existing manufacture processes, said accurate control of the volumetric weight of the expanded material is made possible.

For practicing the method the invention also relates to an apparatus.

BRIEF DESCRIPTION OF THE DRAWINGS

The invention will be explained in more detail below, applied to the pre-expansion of polystyrene material, reference being made to the accompanying drawings which disclose an illustrative apparatus for practising the method of the invention.

In the drawings

DETAILED DESCRIPTION

Figure 1:
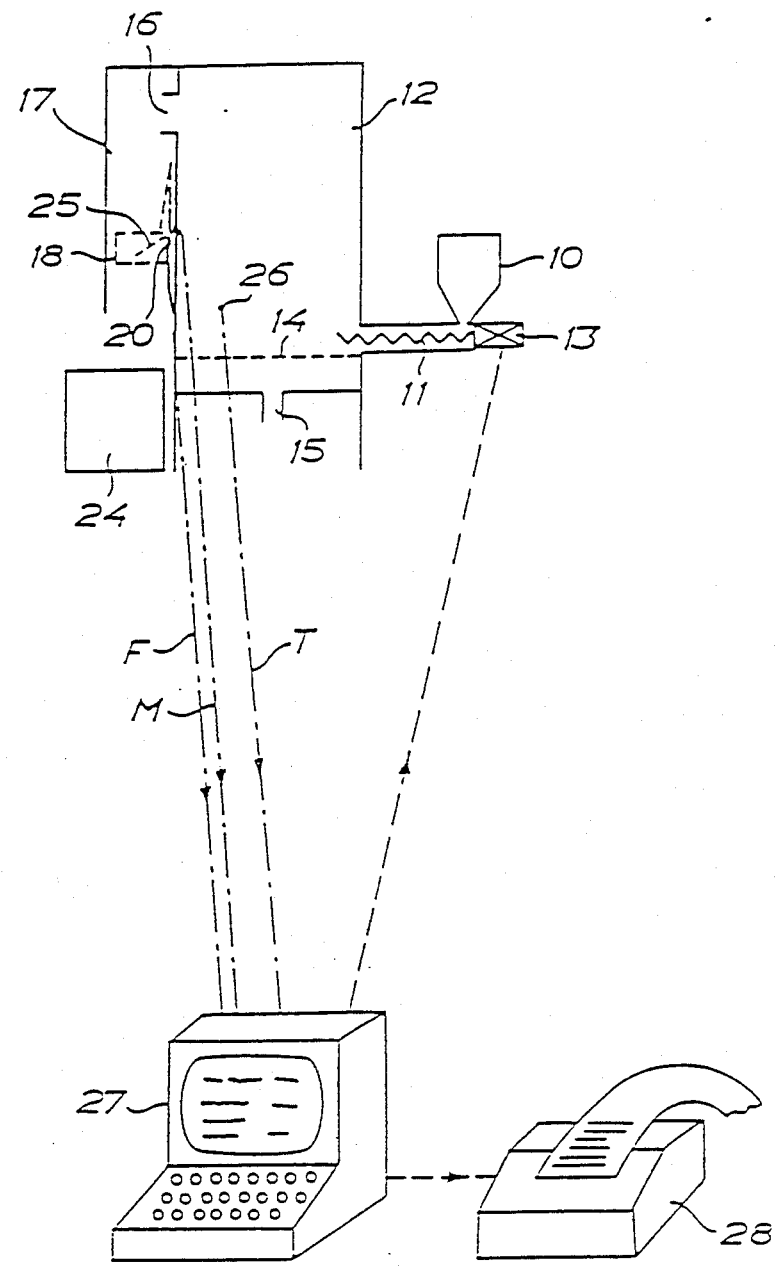
FIG. 1 is a diagrammatic view of the apparatus.

With reference to FIG. 1 a polystyrene granulate which contains a foaming agent, for example pentane, and may have a polymetric weight of 600 to 700 kg/m$^3$, is stored in a silo 10 from which the granulate can be discharged by means of a screw conveyor 11 so as to be supplied to an expansion chamber 12. The screw conveyor is driven by a drive unit 13 which allows the rotary speed of the crew conveyor to be set at different values. In the expansion chamber, the material enters on top of a perforated bottom 15 below which there is provided an inlet 15 for steam. The expansion chamber at the top thereof has an outlet 16 for the material which has been expanded in the chamber. This outlet opens into a shaft 17.

Figure 2:
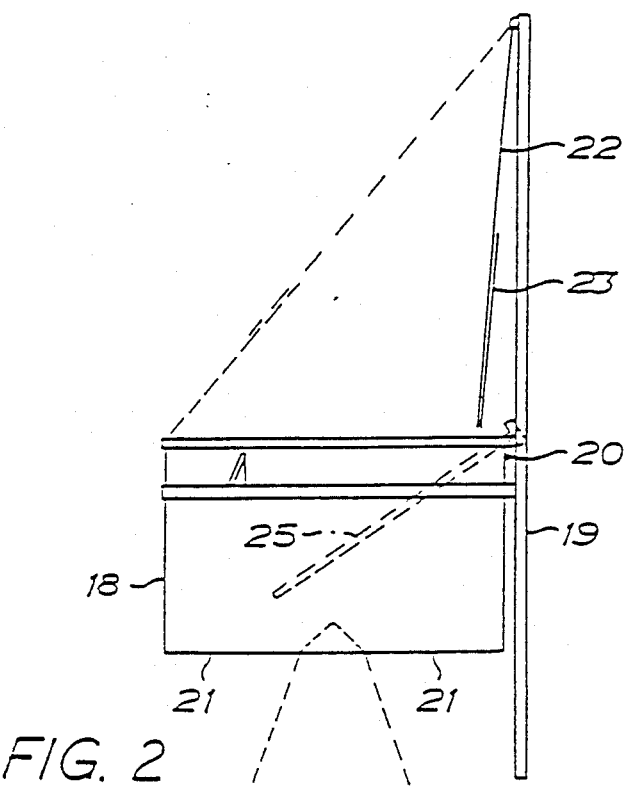
FIG. 2 is an enlarged side view of a weigher tray included in the apparatus.
Figure 3:
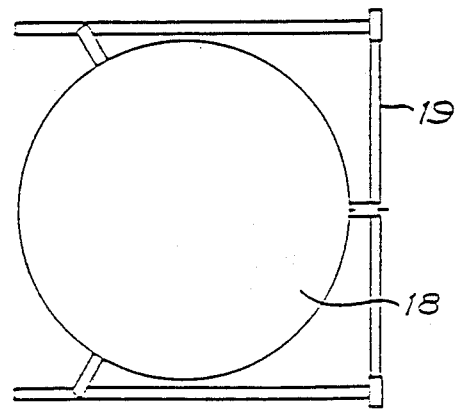
FIG. 3 is a plan view of the weigher tray in FIG. 2.

The shaft 17 contains weighing equipment which is shown in more detail in FIGS. 2 and 3. Said equipment comprises a weigher tray 18 which can have a volume of for example 20 liters and is supported in a manner not shown in detail here, by a load cell in a frame 19 which is mounted over shock absorbers in the shaft 17. The load cell is not shown in detail because it can be mounted in a manner commonly known and applied in the weighing technique, but the connection for receiving the signal from the load cell is indicated at 20. The bottom of the weigher tray consists of two pivotable bottom doors 21 which can be pivoted between a horizontal closed position and a swung down opened position which is indicated by dash lines in FIG. 2. Furthermore, there is provided above the weigher tray a deflector which consists of a plate 22 pivoted at the upper edge thereof, and a plate 23 mounted for plane parallel displacement in relation to the plate 22, said deflector being inoperative in the position shown by solid lines in FIG. 2, but can be adjusted to an operative position which is shown by dash line in FIG. 2. The operation of the bottom doors between closed and opened positions and the operation of the deflector between operative and inoperative positions preferably is accomplished by means of pneumatic cylinders which are not shown here, however, the application of such cylinders can easily be arranged by the man skilled in the art without detailed instructions. When the deflector is in the inoperative position and the bottom doors are in closed position, the weigher tray 18 receives material which has been expanded in the expansion chamber 12 and is delivered therefrom through the outlet 16. When the tray is full, the deflector is adjusted to the operative position, material at the same time being wiped off along the upper edge of the weigher tray. Then, when the deflector has reached the operative position, it prevents expanded material, which is being supplied to the shaft, from falling down into the weigher tray such that the material will instead fall down laterally of the weigher tray. Below the shaft there is provided a so-called fluidized bed 24 for the reception of the material falling down through the shaft, material falling down laterally of the weigher tray as well as material which has been collected in the weigher tray and after having been weighed is discharged therefrom by the bottom doors being opened. In the fluidized bed the expanded material shall be dried and cooled then to be stored and used for the manufacture of for example insulating slabs of expanded polystyrene.

In the weigher tray 18 there is arranged a humidity meter 25, and in the expansion chamber 12 there is arranged a temperature sensor 26 located above the perforated bottom 14 spaced therefrom to measure the temperature in the expansion zone. These two transducers together with the load cell 20 are connected to a microcomputer 27 as has been indicated by dot-and-dash lines in FIG. 1. The computer is connected to a printer 28 and also to the drive unit 13 of the screw conveyor 11 as has been indicated by dash lines in FIG. 1, so as to control by the output signals thereof the printer and the drive unit. Said output signals are dependent of the processing of data supplied, inter alia the signals from the transducers, which takes place in the microcomputer according to the program integrated therewith.

As the polystyrene granulate is fed from the silo 10 into the expansion chamber 12 by means of the screw conveyor 11 the polystyrene is expanded in the expansion chamber by being heated with steam supplied at 15 and passing through the perforated bottom 14. The expanded polystyrene material raises in the expansion chamber during the expansion, the volumetric weight thereof being reduced from 600 to 700 kg/m$^3$ to for example 15 to 20 kg/m$^3$. The period during which the material stays in the expansion chamber is dependent of the desired final volumetric weight; in the example given herein a period of 3 to 6 minutes may be expected. The expanded material passes through the outlet 16 at the upper end of the expansion chamber into the shaft 17 and falls down through the shaft. Once every minute a predetermined quantity of the expanded polystyrene is weighed in the weigher tray 18, namely 20 liters as previously mentioned, by the material falling down being collected in the weigher tray when the deflector 22, 23 thereof is inoperative. When the tray is full, the deflector is adjusted to the operative position. The material received by the weigher tray then is weighed at level measure, the signal of the load cell 20, representing the weight M of the quantity measured, being supplied to the computer together with a signal from the humidity meter 25, which represents the moisture content F of the material that has been weighed. Then the bottom doors 21 are opened and the weighed material is dumped onto the fluidized bed 24 wherein this material together with such expanded material as have passed laterally of the weigher tray during the weighing, is allowed to dry and cool before it is transferred to a storage wherein the material is allowed to stay for a predetermined period in order to allow air to diffuse into the cells before the material is used in the manufacture of insulating slabs.

The operations described for the adjustment of the deflector 22, 23 and the bottom doors 21 can be controlled by means of a timer or from the microcomputer 27.

In the microcomputer the signals supplied are processed for the calculation of the actual volumetric weight at the prevailing moisture content and are compared with a programmed adjustable nominal value of the volumetric weight. At the same time the temperature in the expansion zone is registered. Said comparison can be performed either by the absolute difference between the actual value and the nominal value of the volume weight being established or by the change tendency of the actual value (increasing or decreasing) being established. It is preferred to use said latter type of measurement, derivative measurement, and in that case two points of measuring following one after the other, are required. If the measurement indicates an increasing volumetric weight, the computer 27 supplies a signal to the drive unit 13 of the screw conveyor 11 for decreasing the speed thereof and thus decreasing the supply of material per unit of time such that the raw material supplied to the expansion chamber 12 will have a longer duration of stay in the expansion chamber and thus will be able to expand more, which means a lower volumetric weight. However, if the measurement indicates a decreasing volumetric weight, the microcomputer will supply a signal to the drive unit of the screw conveyor, by which the supply of raw material will be increased. Since a change of the rate at which the granulate is supplied to the expansion chamber effects a change of the volumetric weight of the expanded material with some delay, it is suitable to allow a predetermined period from the time at which a change of the supply rate is called for by the microcomputer, to the time of the next change, and for this reason it is suitable after two measurements following one on the other, which initiate an adjustment signal from the microcomputer to the drive unit 13 of the screw conveyor 11, to allow a predetermined number of measurements without any steps being taken, before a further adjustment signal is supplied to the drive unit.

Figure 4:
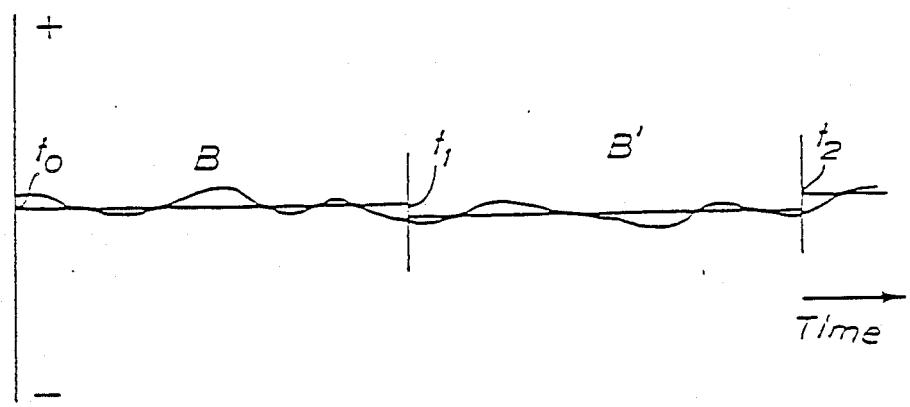
FIG. 4 is a diagram showing variations of the volumetric weight over the time when the control according to the invention is applied.

The actual value of the expanded polystyrene material will vary about the nominal value set in the microcomputer. This is illustrated in FIG. 4 where the vertical axis indicates the time and the horizontal axis indicates the value of the volumetric weight. From the time $t_0$ to the time $t_1$ the actual value of the volumetric weight represented by the curve 29, has varied about the nominal value B set, which is represented by the horizontal axis B in FIG. 4. As will be seen variations have taken place upwards and downwards in relation to the nominal value set, said variations being maintained, however, within the desired limits due to the application of the control proposed according to the invention. However, the average value of the volumetric weight of the product produced will be dependent of how long and how much the volumetric weight has been above and below, respectively, the nominal value set. Considering the production technique that is desired that the average value of the volumetric weight of the expanded polystyrene material produced is the same from one day to the other and equals the nominal value set such that there is obtained a final product including the expanded polystyrene material of uniform quality and satisfies an established standard. In order that this shall be achieved the following procedure is followed. The deviations from the nominal value B set are integrated in the microcomputer over the period $t_0$ to $t_1$ and the average value of the volumetric weight for this period is calculated in the microcomputer, which can be accomplished without the necessity of using complicated programs. Then, a modified nominal value is calculated in the microcomputer, which should be used for the control during the following period, that is from the time $t_1$ to the time $t_2$ in order to keep the production on the desired average value (the nominal value B) of the volumetric weight. If it is assumed that this calculation produces the nominal value B', the continued control takes place with reference to this nominal value from the time $t_1$ to $t_2$. The control during this period will of course produce an average value with some deviation from the nominal value B' modified in the computer, in the same manner as during the proceeding period. Therefore, the control then continues in the same manner during the following period. A modified nominal value B' being set in the computer in order to obtain over the total of the periods a volumetric weight which substantially equals the nominal value B set. The intervals $t_0$ to $t_1$ and $t_1$ to $t_2$ etc. can be chosen to be for example half an hour to one hour.

Via the computer 27 the measured and calculated values of the quantities measured and of the volumetric weight calculated may be printed at desired intervals on the printer 28, and the times as well as other data may be given which relate to the preexpansion and the material used.

The method of the invention can be practised by using other apparatus than that described herein. However, the apparatus described has been found to be well suited for practising the invention.

We claim:

1. A method for measuring and controlling the volumetric weight of a granulate expanded material which is produced by supplying the material together with a foaming agent to an expansion zone, comprising the steps of:

(a) measuring the weight per unit volume (M) of the expanded material,
   (b) comparing the measured volumetric weight with a predetermined desired value (B) of the volumetric weight,
   (c) controlling, in response to said comparison, an operative parameter affecting the expansion of the material,
   (d) integrating existing deviations from the desired value (B) over a predetermined period $(t_0-t_1)$,
   (e) calculating an average value of the volumetric weight for said period,
   (f) calculating a modified desired verage value (B') for a succeeding predetermined period $(t_1-t_2)$, said modified desired average value (B') being the value needed to produce said desired average value (B) when the average volumetric weight is calculated over both of said predetermined periods, and
   (g) controlling the amount of granulate per unit time in accordance with a modified desired value (B') during a subsequent predetermined period $(t_1-t_2)$ to provide an average value over the sum of said periods which thereby equals the predetermined desired value (B).

2. A method according to claim 1 wherein said operative parameter is the amount of granulate supplied per unit time, to be expanded.

3. A method according to claim 1 wherein said operative parameter is the moisture content of granulate supplied per unit time, to be expanded.

* * * * *

UNITED STATES PATENT AND TRADEMARK OFFICE
CERTIFICATE OF CORRECTION

PATENT NO. : 4,852,028
DATED : 25 July 1989
INVENTOR(S) : Heikki Korpela, et al.

It is certified that error appears in the above-identified patent and that said Letters Patent is hereby corrected as shown below:

In column 6, line 13, "verage" should be --average--.

Signed and Sealed this

Seventeenth Day of July, 1990

Attest:

HARRY F. MANBECK, JR.

*Attesting Officer*       *Commissioner of Patents and Trademarks*